United States Patent
Roberts et al.

(10) Patent No.: US 7,684,712 B1
(45) Date of Patent: Mar. 23, 2010

(54) NON-LINEAR EQUALIZER IN A COHERENT OPTICAL RECEIVER

(75) Inventors: Kim B. Roberts, Nepean (CA); Chandra Bontu, Nepean (CA); Kuang Tsan Wu, Kanata (CA); Han Sun, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 658 days.

(21) Appl. No.: 11/551,367

(22) Filed: Oct. 20, 2006

Related U.S. Application Data (60) Provisional application No. 60/728,751, filed on Oct. 21, 2005.

(51) Int. Cl.
*H04B 10/06* (2006.01)
*H04L 27/06* (2006.01)

(52) U.S. Cl. .................... 398/208; 398/211; 375/341

(58) Field of Classification Search ............ 398/208, 398/211; 375/341
See application file for complete search history.

(56) References Cited

U.S. PATENT DOCUMENTS

| | | | |
|---|---|---|---|
| 4,506,388 A | 3/1985 | Monerie et al. |
| 4,720,827 A | 1/1988 | Kanaji |
| 4,723,316 A | 2/1988 | Glance |
| 4,965,858 A | 10/1990 | Naito et al. |
| 5,457,563 A | 10/1995 | Van Deventer |
| 5,473,463 A | 12/1995 | van Deventer |
| 5,995,512 A | 11/1999 | Pogue et al. |
| 6,473,222 B2 | 10/2002 | Hait et al. |
| 6,607,311 B1 | 8/2003 | Fishman et al. |
| 6,782,211 B1 | 8/2004 | Core |
| 2002/0012152 A1 | 1/2002 | Agazzi et al. |
| 2002/0186435 A1 | 12/2002 | Shpantzer et al. |
| 2003/0063285 A1 | 4/2003 | Pering et al. |
| 2003/0123884 A1 | 7/2003 | Willner et al. |

(Continued)

FOREIGN PATENT DOCUMENTS

EP 1453239 A1 9/2004

(Continued)

OTHER PUBLICATIONS

Chiang et al.; High-speed optical receiver with soft decision ISI cancellation; Lightwave Technology, Journal of vol. 11, Issue 2, Feb. 1993 pp. 343-350.*

(Continued)

*Primary Examiner*—Nathan M Curs
(74) *Attorney, Agent, or Firm*—Kent Daniels; Blake, Cassels & Graydon LLP (57) ABSTRACT

A method of recovering a most likely value of each symbol transmitted through an optical communications network using a high speed optical signal. A stream of multi-bit digital samples of the optical signal is processed to generate a respective multi-bit estimate X'(n) of each transmitted symbol. A first function is applied to each symbol estimate X'(n) to generate a corresponding soft decision value $\tilde{X}(n)$. Each soft decision value $\tilde{X}(n)$ is processed to generate a corresponding hard decision value. $\hat{X}(n)$ having an ideal amplitude and phase. A plurality of successive soft decision values and hard decision values are processed to determine a second function, which is applied to each soft decision value $\tilde{X}(n)$ to generate a most likely symbol value $\hat{X}(n)$.

22 Claims, 11 Drawing Sheets

U.S. PATENT DOCUMENTS

| | | | |
|---|---|---|---|
| 2003/0175034 A1 | 9/2003 | Noe | |
| 2004/0114939 A1 | 6/2004 | Taylor | |
| 2005/0196176 A1 | 9/2005 | Sun et al. | |
| 2006/0285852 A1* | 12/2006 | Xi et al. | 398/141 |
| 2007/0177885 A1* | 8/2007 | Abe et al. | 398/212 |
| 2008/0025733 A1* | 1/2008 | Nazarathy et al. | 398/209 |

FOREIGN PATENT DOCUMENTS

| | | |
|---|---|---|
| GB | 2214381 A | 8/1989 |
| WO | WO 00/60776 A1 | 10/2000 |
| WO | WO 02/27994 A1 | 4/2002 |

OTHER PUBLICATIONS

Richard A. Linke, et al., "High-Capacity Coherent Lightwave Systems", Journal of Lightwave Technology, vol. 6, No. 11, Nov. 1988, pp. 1750-1769.

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeated optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cai, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Quadature Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler et al., "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.

Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.

Ezra IP, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

* cited by examiner

NON-LINEAR EQUALIZER IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to a non-linear equalizer in a coherent optical receiver.

BACKGROUND OF THE INVENTION

Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered. Various methods and systems intended to address some of these limitations are known in the art.

Figure 1:
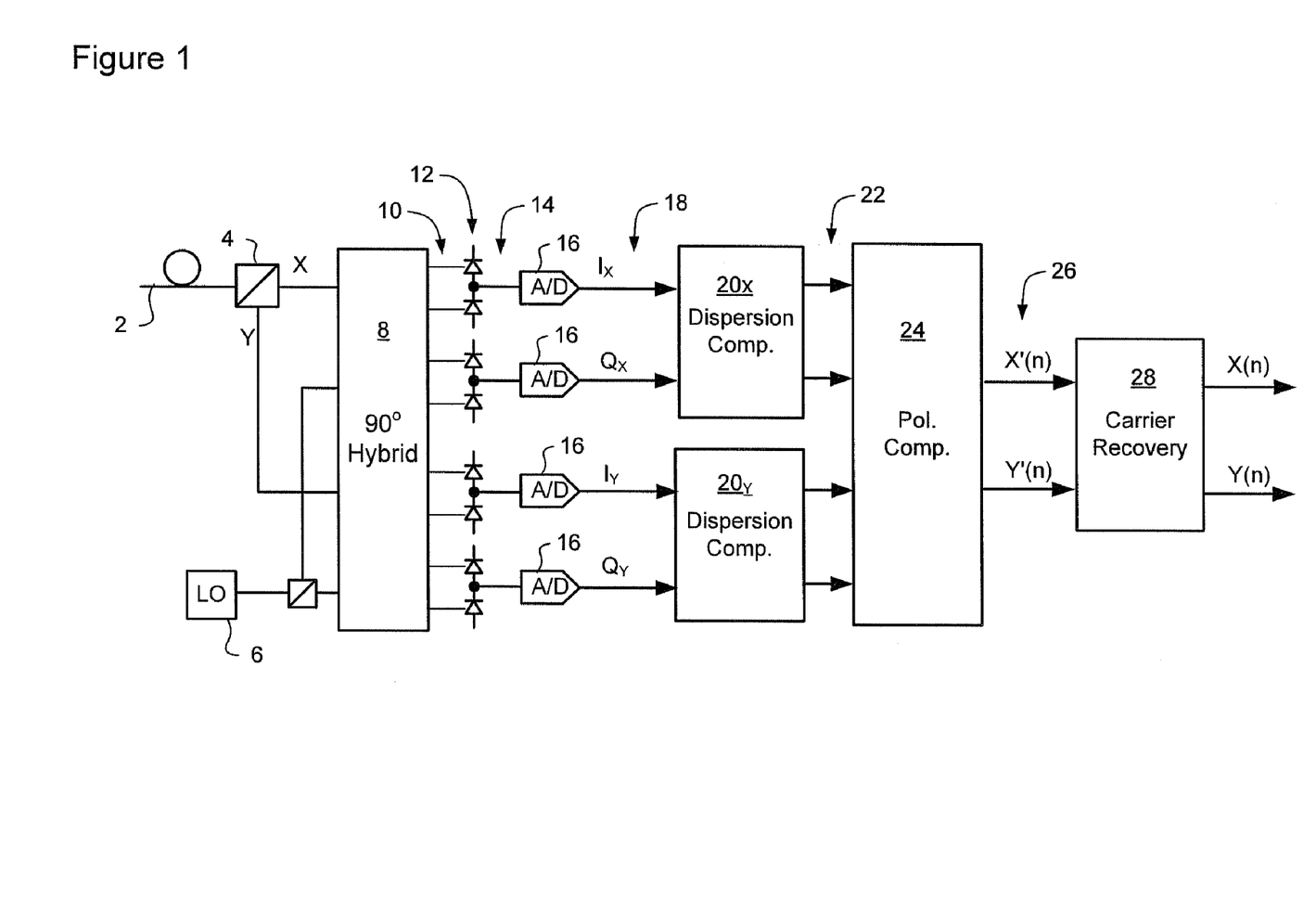
FIG. 1 is a block diagram schematically illustrating principal elements and operations of a coherent optical receiver known from Applicant's co-pending U.S. patent application Ser. Nos. 11/294,613; 11/315,342; 11/315,345; 11/366,392; and 11/423,822.

FIG. 1 schematically illustrates a representative coherent optical receiver capable of implementing the methods of Applicant's co-pending U.S. patent application Ser. Nos. 11/294,613 filed Dec. 6, 2005 and entitled "Polarization Compensation In A Coherent Optical Receiver"; 11/315,342 filed Dec. 23, 2005 and entitled "Clock Recovery From An Optical Signal With Dispersion Impairments"; 11/315,345 filed Dec. 23, 2005 and entitled "Clock Recovery From An Optical Signal With Polarization Impairments"; 11/366,392 filed Mar. 2, 2006 and entitled "Carrier Recovery In A Coherent Optical Receiver"; and 11/423,822 filed Jun. 13, 2006 and entitled "Signal Acquisition In A Coherent optical Receiver", the content of all of which are hereby incorporated herein by reference.

As may be seen in FIG. 1, an inbound optical signal is received through an optical link 2, split into orthogonal received polarizations by a Polarization Beam Splitter 4, and then mixed with a Local Oscillator (LO) signal 6 by a conventional 90° optical hybrid 8. The composite optical signals 10 emerging from the optical hybrid 8 are supplied to respective photodetectors 12, which generate corresponding analog electrical signals 14. The photodetector signals 14 are sampled by respective Analog-to-Digital (A/D) converters 16 to yield raw multi-bit digital signals 18 corresponding to In-phase (I) and Quadrature (Q) components of each of the received polarizations.

The resolution of the A/D converters 16 is a balance between performance and cost. It has been found that a resolution of n=5 or 6 bits provides satisfactory performance, at an acceptable cost. The sample rate of the A/D converters 16 is selected to satisfy the Nyquist criterion for the highest anticipated symbol rate of the received optical signal.

From the A/D converter 16 block, the respective n-bit I and Q signals 18 of each received polarization are supplied to a respective dispersion compensator 20, which operates on the raw digital signal(s) 18 to at least partially compensate chromatic dispersion of the received optical signal.

The dispersion-compensated digital signals 22 appearing at the output of the dispersion compensators 20 are then supplied to a polarization compensator 24 which operates to compensate polarization effects, and thereby de-convolve transmitted symbols from the complex signals 22 output from the dispersion compensators 20. If desired, the polarization compensator 24 may operate as described in Applicant's co-pending U.S. patent application Ser. No. 11/294,613 filed Dec. 6, 2005. The output of the polarization compensator 24 is a pair of multi-bit estimates 26 X'(n) and Y'(n) of the symbols encoded on each transmitted polarization. These symbol estimates 26 X'(n), Y'(n) contain both amplitude and phase information of each transmitted symbol, and include phase error due to the frequency offset between the Tx and LO frequencies, laser line width and phase noise. In some embodiments, the symbol estimates 26 are 10-bit digital values, comprising 5-bits for each of real and imaginary components of each symbol estimate.

The symbol estimates 26 X'(n), Y'(n), appearing at the output of the polarization compensator 24 are then supplied to a carrier recovery block 28 for LO frequency control, symbol detection and data recovery, such as described in Applicant's co-pending U.S. patent application Ser. No. 11/366,392 filed Mar. 2, 2006.

Figure 2:
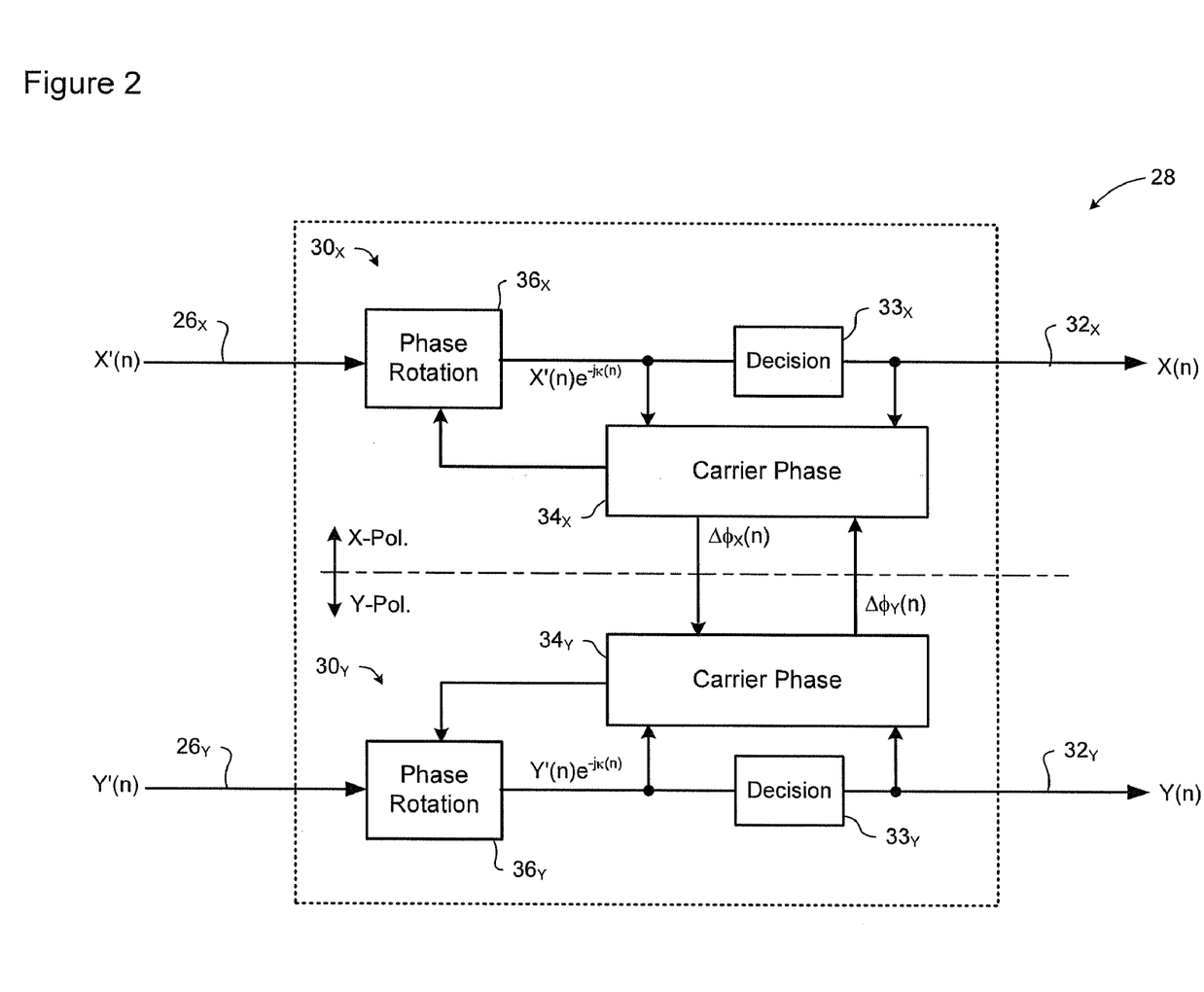
FIG. 2 is a block diagram schematically illustrating principal elements and operations of a carrier recovery block usable in the coherent optical receiver of FIG. 1.

As may be seen in FIG. 2, the carrier recovery block 28 is divided into two substantially identical processing paths 30; one for each transmitted polarization. Each processing path 30 receives a respective stream of symbol estimates 26 output by the polarization compensator 24, and outputs recovered symbols 32 of its respective transmitted polarization. Each processing path 30 includes a decision circuit 33 and a carrier recovery loop comprising a carrier phase detector 34 and a phase rotator 36. In general, the phase rotators 36 use a carrier phase estimate generated by the respective carrier phase detector 34 to compute and apply a phase rotation K(n) to the symbol estimates X'(n) and Y'(n) received from the polarization compensator 24. The resulting phase-rotated symbol estimates $X'(n)e^{-jk(n)}$ and $Y'(n)e^{-jk(n)}$ are assumed to lie within the correct quadrant of the QPSK phase diagram. Accordingly, the decision circuits 40 use each successive phase-rotated symbol estimate $X'(n)e^{-jk(n)}$ and $Y'(n)e^{-jk(n)}$ to generate corresponding recovered symbol values X(n) and Y(n) having ideal phase and amplitude values for the quadrant in which the phase-rotated symbol estimates are located. The phase detectors 34 operate to detect respective phase errors $\Delta\phi$ between the rotated symbol estimates $X'(n)e^{-jk(n)}$ and $Y'(n)e^{-jk(n)}$ and the corresponding recovered symbol values X(n) and Y(n). This operation is described in detail in Applicant's co-pending U.S. patent application Ser. No. 11/366,392 filed Mar. 2, 2006.

An advantage of the system of FIGS. 1 and 2 is that reliable signal acquisition, clock recovery, compensation of dispersion and polarization effects, carrier recovery and Local Oscillator (LO) control can be accomplished, even in the presence of moderate-to-severe optical impairments. Taken in combination, these elements enable the deployment of a coherent optical receiver in real-world optical networks, with attractive signal reach and line rate characteristics. A limitation of this system, however, is that in severely impaired environments, the bit error rate (BER) of the recovered symbol values X(n) and Y(n) may be undesirably increased by residual Inter Symbol Interference (ISI) and DC offset in the rotated symbol estimates $X'(n)e^{-jk(n)}$ and $Y'(n)e^{-jk(n)}$.

Accordingly, methods and techniques that enable cost effective compensation of DC offset and residual ISI in a receiver unit of an optical network remain highly desirable.

SUMMARY OF THE INVENTION

An object of the present invention is to provide methods and techniques that enable carrier recovery in a receiver unit of an optical network.

Thus, an aspect of the present invention provides a method of recovering a most likely value of each symbol transmitted through an optical communications network using a high speed optical signal. A stream of multi-bit digital samples of the optical signal is processed to generate a respective multi-bit estimate X'(n) of each transmitted symbol. A first function is applied to each symbol estimate X'(n) to generate a corresponding soft decision value $\tilde{X}(n)$. Each soft decision value $\tilde{X}(n)$ is processed to generate a corresponding hard decision value $\hat{X}(n)$ having an ideal amplitude and phase. A plurality of successive soft decision values and hard decision values are processed to determine a second function, which is applied to each soft decision value $\tilde{X}(n)$ to generate a most likely symbol value $\hat{X}(n)$.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and techniques for compensation of non-linear impairments in a receiver unit of an optical network. Embodiments of the present invention are described below, by way of example only, with reference to FIGS. 3-11.

Figure 3:
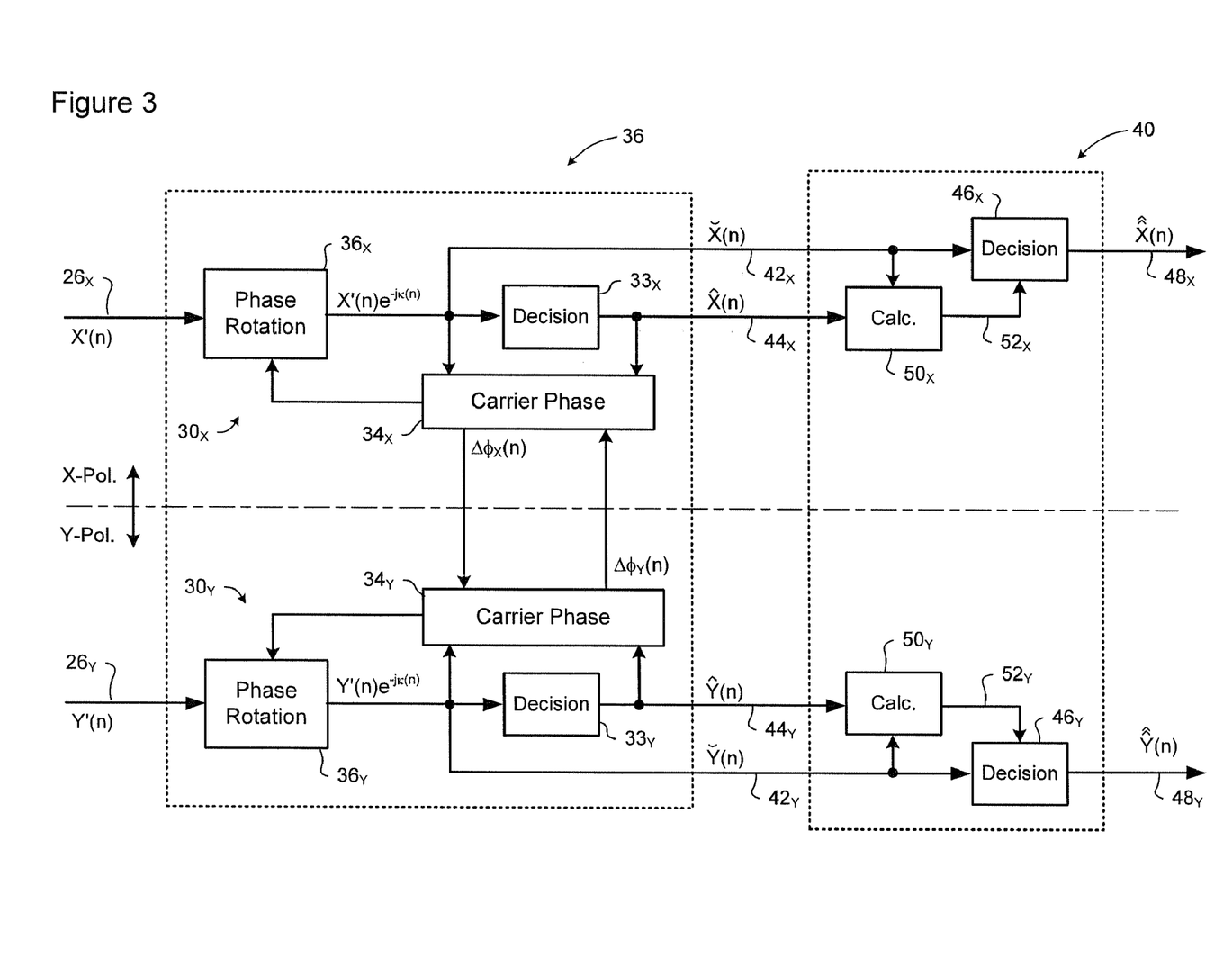
FIG. 3 is a block diagram schematically illustrating principal elements and operations of a carrier recovery block and a non-linear compensator implementing methods in accordance with a first embodiment of the present invention.

In general, the present invention provides a system in which compensation of residual ISI and DC offset is performed by digitally processing symbol value decisions generated by the carrier recovery block 28. FIG. 3 schematically illustrates a representative system implementing methods of the present invention.

As may be seen in FIG. 3, a preferred system in accordance with the present invention comprises a carrier recovery block 38 and a non-linear compensator (NLC) 40 connected in series. Preferably, the carrier recovery block 38 is virtually identical to that of FIG. 2, except that, instead of recovered symbol values 28 X(n), Y(n), the carrier recovery block 38 outputs respective hard and soft symbol value decisions for each transmitted polarization. In the embodiment of FIG. 3, the rotated symbol estimates X'(n)$e^{-jk(n)}$ and Y'(n)$e^{-jk(n)}$ are tapped and output as corresponding soft decisions 42 $\tilde{X}'(n)$, $\tilde{Y}(n)$. The recovered symbol values 32 X(n), Y(n) output by the carrier recovery block of FIG. 2 are, in the embodiment of FIG. 3, treated as the corresponding hard decision values 44 $\hat{X}(n)$, $\hat{Y}(n)$.

The relationship described above between the soft decisions 42 (i.e. the rotated symbol estimates X'(n)$e^{-jk(n)}$ and Y'(n)$e^{-jk(n)}$ and the hard decisions 44 remain unchanged. That is, the soft decisions 42 are symbol estimates (output from the polarization compensator 24) which have been rotated to compensate frequency mismatch between the Local Oscillator 6 and the received carrier. While the soft decisions 42 are assumed to lie within the correct quadrant of the QPSK space, this assumption may be inaccurate due to residual ISI and DC offset. The hard decisions 44 are symbol estimates having ideal amplitude and phase for the quadrant in which the soft decisions 42 are located. As such, to the extent that ISI and DC offset can erroneously shift a soft decision 42 into the wrong quadrant, the corresponding hard decisions 44 will also be inaccurate.

As maybe seen in FIG. 3, the NLC block 40 generally comprises, for each polarization, a respective NLC decision block 46 which processes the soft decisions 42 to generate symbol decision values 48 in which DC offset and residual ISI have been at least partially compensated. A parameter calculator 50 uses both the hard decision values 44 and the soft decision values 42 to determine a set of parameter values 52 used by the NLC decision block 46.

In some embodiments, the NLC decision block 46 implements a Bayesian rule to estimate a most likely symbol value 48, based on the soft decisions 42 received from the carrier recovery block 38. One method of implementing this operation is through the use of a look-up table (LUT) in which each successive soft decision value 42 is used to address a corresponding LUT register which contains the estimated symbol value 48. In such cases, the parameter calculator 50 operates to calculate, for every possible soft decision value $\tilde{X}(n), \tilde{Y}(n)$ the corresponding symbol value estimate $\hat{X}(n), \hat{Y}(n)$ which is then stored in the appropriate LUT register.

In some embodiments, the Bayesian rule is implemented by calculating a respective probability for each possible value of a transmitted symbol, given an input array of symbol estimates, and then selecting the symbol value which has the highest probability. For example, consider a, QPSK encoded signal. Each symbol can take on one of four possible values (i.e. 00, 10, 01, 11). A respective probability that a soft decision value $\breve{X}(n-1)$ corresponds to each can of these values, given an input array $\hat{X}$, $\hat{Y}$ of hard decision values, can be computed. In principle, any desired number of hard decision values can be used in the input array. In embodiments in which the dispersion compensator 20, polarization compensator 24 and carrier recovery block 28 are effective in compensating linear impairments, an input array of three consecutive hard decision values (e.g. $\hat{X}=\{\hat{X}(n), \hat{X}(n-1), \hat{X}(n-2)\}$) can be used. In such cases, and assuming that noise is Gaussian distributed with variance $$\frac{N_0}{2},$$

the respective probability that a soft decision value $\breve{X}(n-1)$ corresponds to each one of the possible symbol values (00, 10, 01, 11), can be represented as:

$$P\left(\breve{X}(n-1)\middle|X\right) \propto \exp\left(-\frac{|\breve{X}(n-1) - \Im[X(n), X(n-1), X(n-2)]|^2}{N_0}\right).$$

In this formulation, $\Im[X(n), X(n-1), X(n-2)]$ is an "ISI compensation value", which models the frequency with which the soft decision value $\breve{X}(n-1)$ occurs in the presence of the input array $\hat{X}=\{\hat{X}(n), \hat{X}(n-1), \hat{X}(n-2)\}$ of hard decision values. This value can be accumulated from the hard and soft decision values generated by the carrier recovery block 28, as will be described in greater detail below.

The most likely value for the transmitted symbol can then be represented by:

$$\hat{\hat{X}}(n-1) =$$

$$\underset{a \in \{00,01,10,11\} \forall X: \breve{X}(n-1) \infty a}{\arg\max} \sum \exp\left(-\frac{|\breve{X}(n-1) - \Im[X(n), X(n-1), X(n-2)]|^2}{N_0}\right)$$

As may be appreciated, in some cases the parameter P(m) may be represented as a Euclidian distance metric, in which case the symbol value corresponding with the lowest value of P(m) would be selected.

Figure 4:
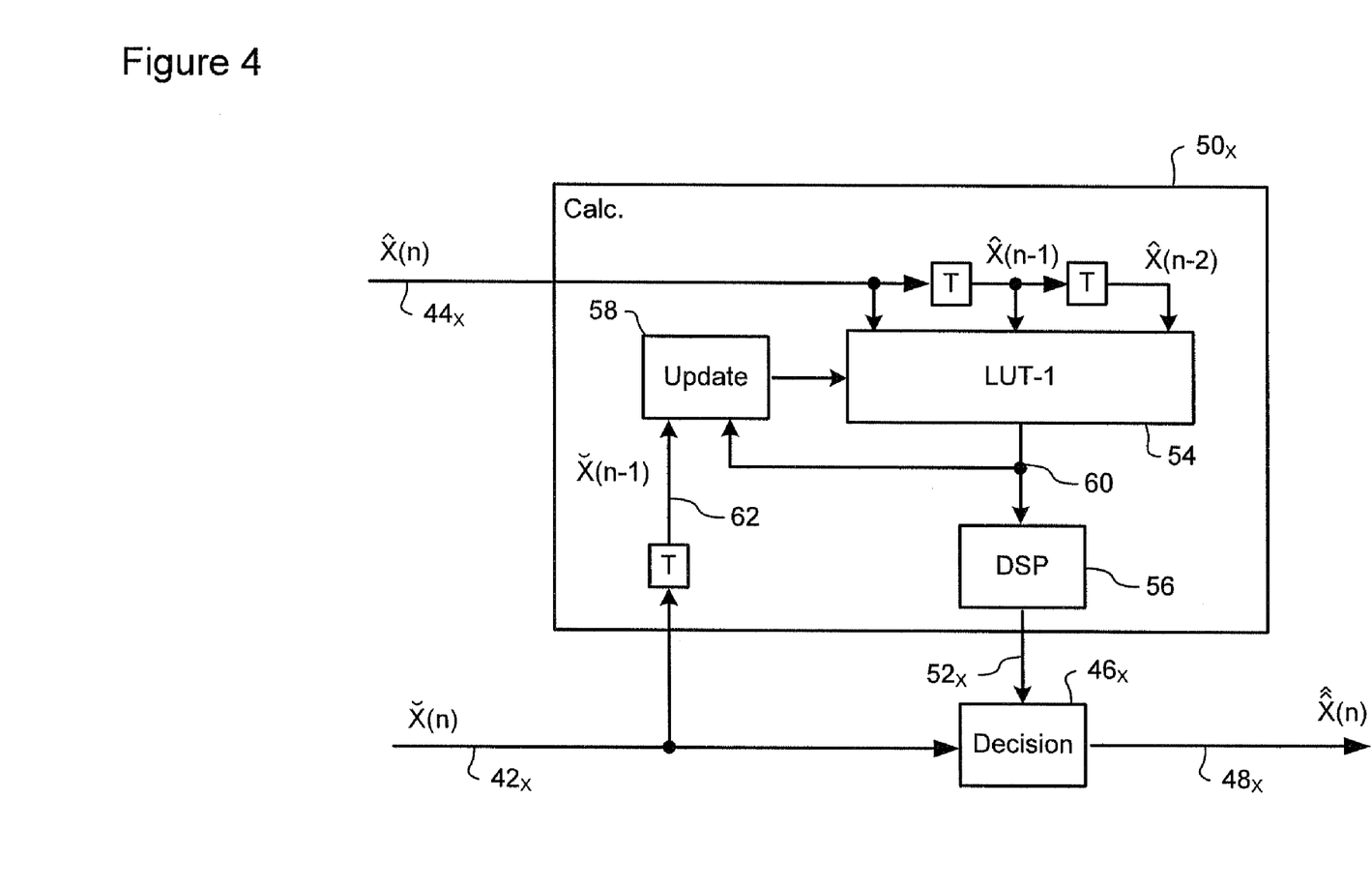
FIG. 4 is a block diagram schematically illustrating principal elements and operations of the non-linear compensator of FIG. 3.

FIG. 4 illustrates a representative implementation of this operation in greater detail. In the embodiment of FIG. 4, the parameter calculator 50 comprises a look-up table (LUT-1) 54, a processor (DSP) 56, and a training loop 58 for updating the values stored in LUT-1 54. For convenience of description, the parameter calculator 50 and decision block 46 are shown for the X-polarization only. It will be appreciated that the Y-polarization parameter calculator 50y and decision block 46y will be substantially identical.

The look-up table (LUT-1) 54 operates to receive three consecutive hard decision values $\hat{X}(n)$, $\hat{X}(n-1)$ and $\hat{X}(n-2)$, which are simply concatenated together at the LUT-1 address input to access the desired register of the look-up-table 54. In embodiments in which each hard decision value 44 is a 2-bit binary value, this yields a 6-bit binary address Addr (=16*$\hat{X}(n-1)$+4*$\hat{X}(n)$+$\hat{X}(n-2)$, for example), capable of accessing up to 64 registers of the LUT-1 54. The content of each register of LUT-1 54 is an ISI-compensation value $\Im_n[\text{Addr}]$ 60 which can be used by the processor 56 to compute the highest probability symbol value estimates 52 for the NLC decision block 46. In some embodiments $\Im_n[\text{Addr}]$ contains 10-bits real and 10-bit imaginary values in 2's complement, i.e., it is regarded as a complex number I+j*Q.

In the embodiment of FIG. 4, each ISI-compensation value $\Im_n[\text{Addr}]$ stored in the LUT-1 54 is updated during each symbol period by the training loop 58, based on a delayed soft decision value $\breve{X}(n-1)$ 62 and the previously stored value $\Im_{n-1}[\text{Addr}]$. One possible update computation is: $\Im_n[\text{Addr}]=\Im_{n-1}[\text{Addr}]+\mu_{NC}[\alpha*\breve{X}(n-1)-\Im_{n-1}[\text{Addr}]]$, (where $\alpha$ is a scaling factor used to adjust the number of bits resolution of $\breve{X}(n-1)$ to equal that of $\Im_n[\text{Addr}]$; and $\mu_{NC}$ is a training step size, which can be selected to provide a desired adaptation response. For example, consider an embodiment in which the real and imaginary components of $\breve{X}(n-1)$ (regarded as a complex number) are 5 bits each and $\Im_n[\text{Addr}]$ is a complex number with 10-bit real and 10-bit imaginary values. In such cases, $\alpha=32$, in order to convert each 5-bit component of $\breve{X}(n-1)$ into a 10-bit value. In general, it is desirable that the adaptation response be comparatively slow, which can be accomplished by setting $\mu_{NC}$ to a suitably low value. In practice, a value of $\mu_{NC}$ between $2^{-5}$ and $2^{-6}$ (and preferably near $2^{-4}$) has been found to yield acceptable performance.

At system start-up, it is preferable to default all of the LUT-1 register values to zero, which corresponds to an assumption of zero residual ISI. This allows the training loop 58 to gradually increase ISI compensation as needed.

Figure 5:
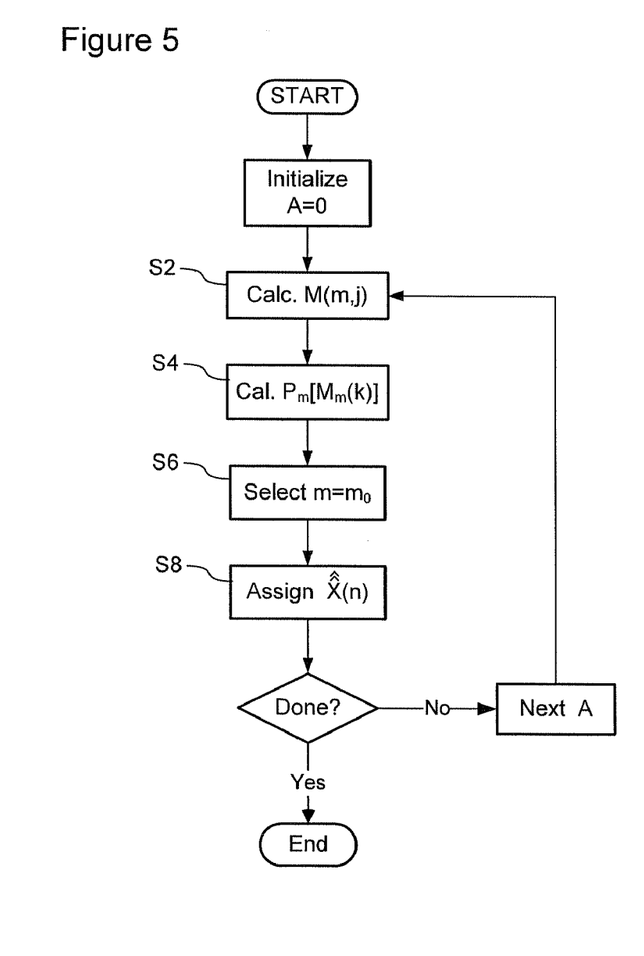
FIG. 5 is a flow chart illustrating principle steps in a representative method for determining most probable symbol value estimates for each possible soft decision value, usable in the embodiment of FIG. 4.

The processor 56 uses the ISI-compensation values $\Im_n[\text{Addr}]$ stored in LUT-1 54 to calculate, for every possible soft decision value 42 $\breve{X}(n)$, $\breve{Y}(n)$ the most likely symbol value estimate 48 $\hat{X}(n)$, $\hat{Y}(n)$. FIG. 5 illustrates a representative process for performing this operation, for a case in which noise is assumed to be Gaussian distributed with variance $$\frac{N_0}{2}$$

(Where $N_0$ represents an expected noise floor). Here again, it will be seen that FIG. 5, refers specifically to X-polarization values. It will be appreciated that the same process is used for the Y-polarization.

As shown in FIG. 5, for each possible value A (a complex number with 5-bit resolution in 2's complement for its real and imaginary parts) of the soft decision 42, an array of distance metrics M(m,j) are calculated (at step S2). For QPSK and 4ASK encoded, symbols, $$M(m, j) = \frac{|\alpha * A - \Im[16m + j]|^{2'}}{N_0}$$

(m—0 . . . 3, j=0 . . . 15), whereas for BPSK encoded symbols, $$M(m, j) = \frac{|\alpha * A - \Im[4m + j]|^2}{N_0}$$

(m=0 . . . 1, j=0 . . . 3). In some embodiments, it is useful to arrange Addr=16*$\hat{X}(n-1)$+4*$\hat{X}(n)$+$\hat{X}(n-2)$, as this ensures that each row of M(m,j) corresponds with unique one of the possible symbol values. In both formulations, $N_0$ represents an expected noise floor.

$$\log_2\left(\frac{1}{N_0}\right) = 10$$

corresponds to approximately 21 dB SNR for QPSK/BPSK encoded symbols and approximately 19 dB SNR for 4ASK encoded symbols.

For each row (m) of the array, the probability parameters P(m) can be calculated using a recursive calculation (at step S4) as follows:

$$P(m) = M(m, 0) * \alpha$$

$$P(m) = -\min\{M(m, k), P(m)\} + \text{floor}\left[\alpha * \log\left(1 + e^{\frac{|M(m,k)-P(m)|}{\alpha}}\right) + 0.5\right]$$

Where k=1 . . . 3 for BPSK encoded symbols and k=1 . . . 15 for QPSK and 4ASK encoded symbols. The result of this recursive operation is a set of probability parameter values P(m), m=0 . . . 1 for BPSK and m=0 . . . 3 for QPSK and 4ASK encoded symbols, which models the probability that a transmitted symbol corresponds with each one of the possible values. An index value $m=m_0$ which corresponds to max[P(m)] is then selected (at step S6), and can be mapped to the most probable symbol value $\hat{X}(n)$ corresponding to the soft decision value $\tilde{X}(n)$=A (at step S8) using the table of FIG. 6, and saved in the appropriate register of the NLC decision block.

Figure 6:
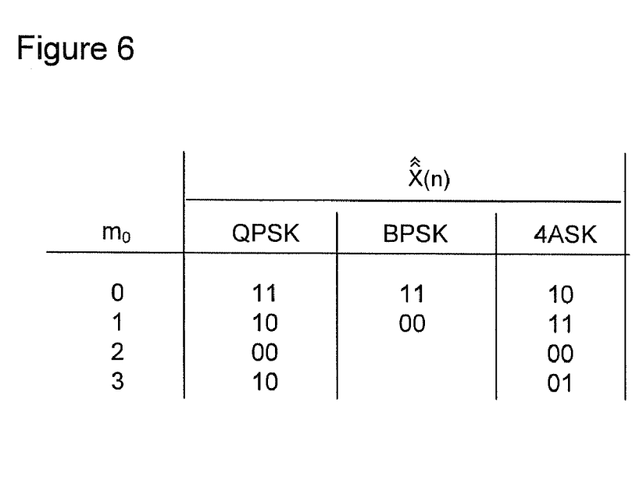
FIG. 6 is a table used in the method of FIG. 5.

In the above-described embodiment, the most probable symbol value $\hat{X}(n)$ is computed for each possible soft decision value $\tilde{X}(n)$=A. As mentioned above, in some cases, the probability function an be replaced by a Euclidian distance metric. In this case, the above-described processing steps are used, but with simplified distance metrics and "probability" parameter calculations. Thus, the distance metrics computed above can be simplified to $M(m,j)=|\alpha*A-\Im[16m+j]|^2$ (m=0 . . . 3, j=0 . . . 15), for QPSK and 4ASK encoded symbols; and $M(m,j)=|\alpha*A-\Im[4m+j]|^2$ (m=0 . . . 1, j=0 . . . 3), for BPSK encoded symbols. The "probability" parameter P(m), which in this case will represent the Euclidean distance metric then be computed using $$P(m) = \sum_j |\alpha * A - \Im[16m + j]|^2,$$

where k=1 . . . 3 for BPSK encoded symbols and k=1 . . . 15 for QPSK and 4ASK encoded symbols. The most likely symbol value $\hat{X}(n)$ can be found using the value $m=m_0$ corresponding to min [P(m)] and the table of FIG. 6.

In the above-described embodiments, the ISI compensation value $\Im$[Addr] is updated, at the full symbol rate, for each soft decision value 42 received from the carrier recovery block 38, and saved in the LUT-1 54 register given by the corresponding hard decision values $\hat{X}(n)$, $\hat{X}(n-1)$ and $\hat{X}(n-2)$. However, this is not essential. If desired, a selected subset of the soft decisions 42 can be used. For example, in some embodiments it is desirable to format the optical signal into data bursts comprising a plurality of data symbols, separated by a SYNC burst having a known symbol sequence. In such cases, it may be beneficial, to compute ISI compensation values $\Im_n$[Addr] using only the known symbols of each SYNC burst. This can be advantageous because the known SYNC symbol values can be used to improve the accuracy of the distance metric M(m,j).

The embodiments described above with reference to FIGS. 2-6 provide a single data path through the receiver. As will be appreciated, this requires that the carrier recovery block 38 and NLC block 40 operate at the full line rate of the optical signal. For the case of a 10 Gbaud optical signal, this means that these blocks must operate fast enough to process symbols at 10 GHz. In some cases, it may be desirable to divide the data path into a number of parallel paths, which allows at least the carrier recovery and symbol decision operations to be performed at a lower rate. A representative coherent optical receiver implementing such an arrangement is described below with reference to FIGS. 7-11.

Figure 7:
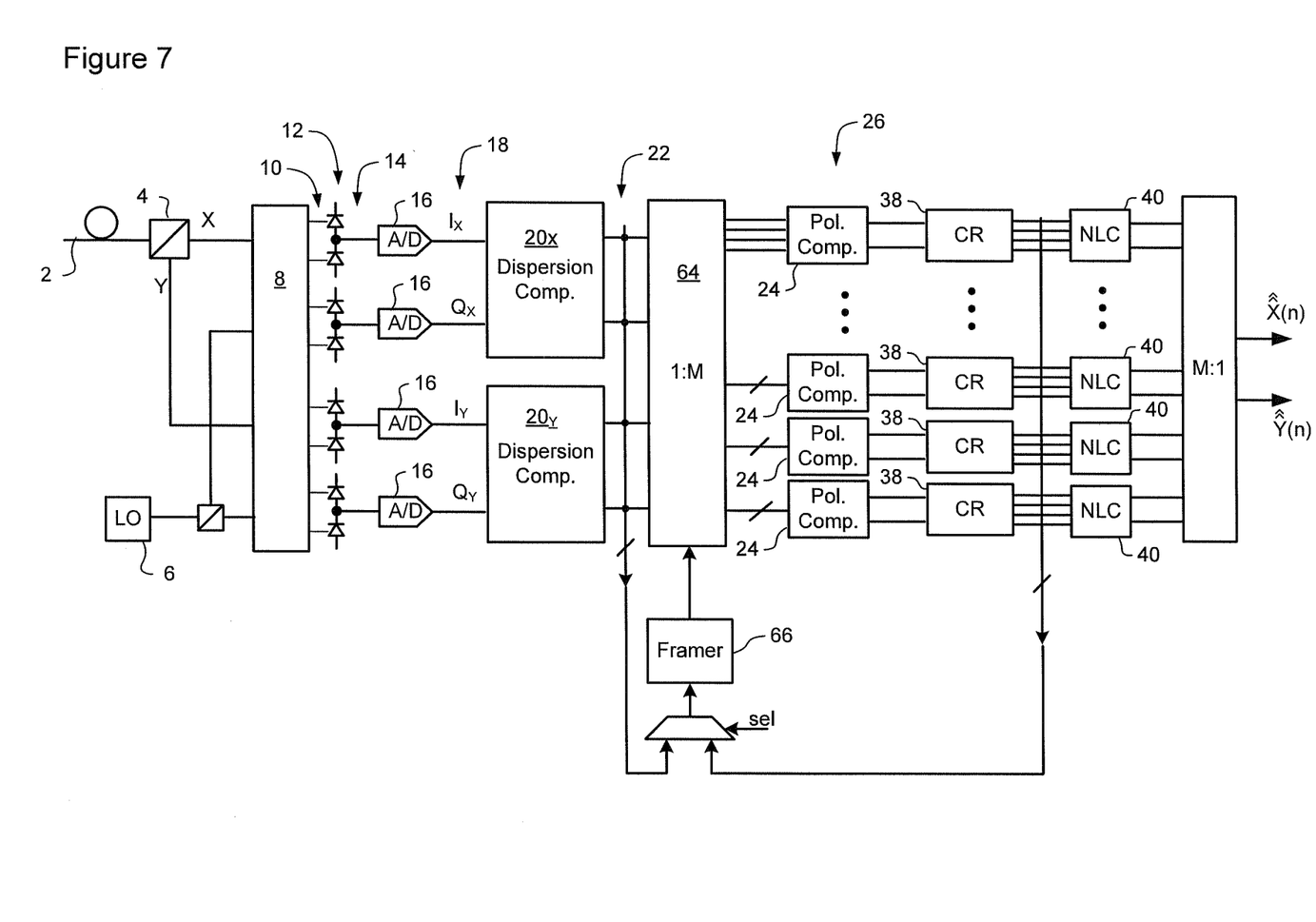
FIG. 7 is a block diagram schematically illustrating principal elements and operations of a second coherent optical receiver, implementing methods of the present invention.

In the embodiment of in FIG. 7, the receiver front end is substantially identical to that of FIG. 1. Thus, an inbound optical signal is received through an optical link 2, split into orthogonal polarizations by a Polarization Beam Splitter 4, and then mixed with a Local Oscillator (LO) signal 6 by a conventional 90° optical hybrid 8. The composite optical signals 10 emerging from the optical hybrid 8 are supplied to respective photodetectors 12, which generate corresponding analog signals 14. The analog photodetector signals 14 are sampled by respective Analog-to-Digital (A/D) converters 16 to yield multi-bit digital signals 18 corresponding to In-phase (I) and Quadrature (Q) components of each of the received polarizations, which are then processed by the dispersion compensators 20 as described above.

In the embodiment of FIG. 7, the dispersion-compensated sample streams 22 appearing at the output of the dispersion compensators 20 are then supplied to a 1:M distribution unit 64, which operates to partition the dispersion compensated sample streams 22 into M parallel sample streams, each of which can be processed at a lower sample rate (by a factor of M).

Figure 8A:
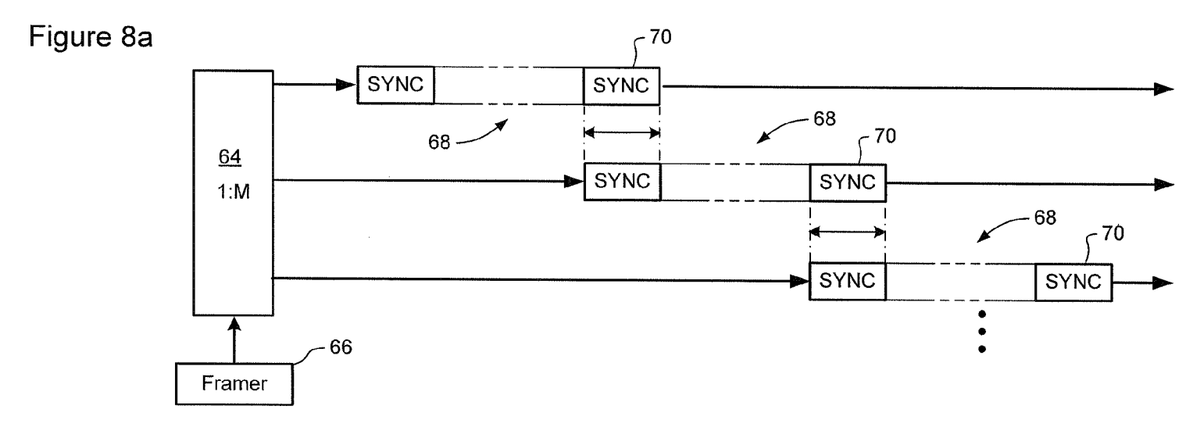
FIGS. 8a and 8b are block diagrams illustrating operation of the distribution block of FIG. 7.
Figure 8B:
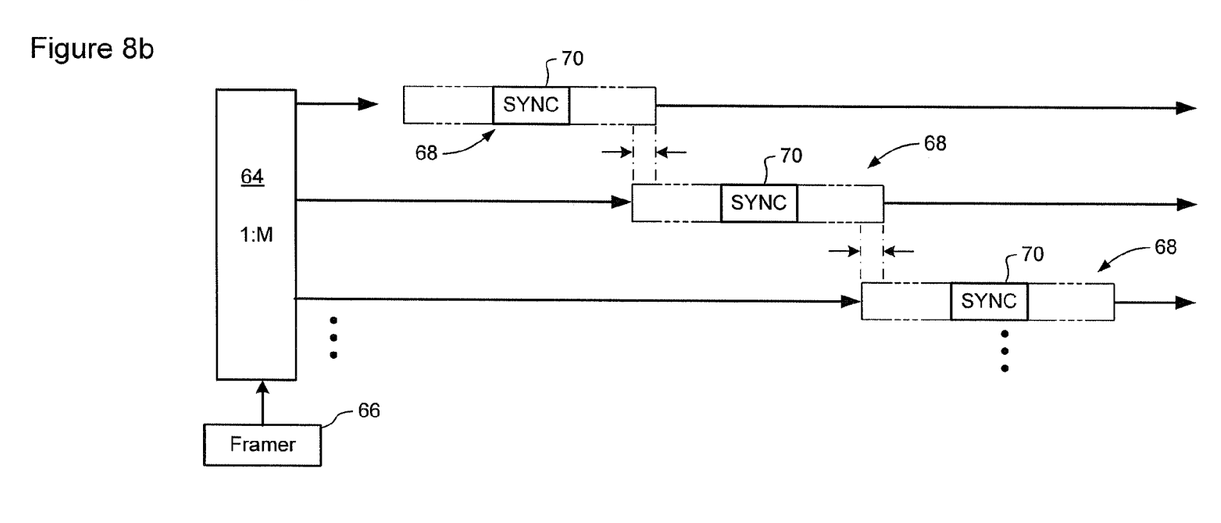

In the illustrated embodiments, the distribution unit 64 is implemented as a "burst switch" controlled by a framer 66, to generate overlapping blocks of samples 68 (FIG. 8). One implementation of a burst switch may, for example, include a multi-port Random Access Memory (RAM), which provides a respective set of registers for each data path. This arrangement allows samples to be simultaneously supplied to two or more data paths, while at the same time accommodating the change in clock speed.

FIG. 8a shows an embodiment in which each block of samples 68 encompasses two consecutive SYNC bursts 70, and any data symbols lying between them. In this case, the amount of overlap between sample blocks 68 in adjacent data paths is nominally equivalent to one SYNC burst 70. In some cases, it may desirable to increase the amount of overlap (e.g. by about the width of the polarization compensators) to ensure continuity of polarization compensation across all of the samples encompassing both of the involved SYNC bursts 70.

In the embodiment of FIG. 8b, each block of samples 68 is centered on a SYNC burst 70, and nominally spans half of the data samples between the involved SYNC burst 70 and each of the immediately preceding and following SYNC bursts. A number of "buffer" samples, which may be equal to the width of the polarization compensator 24, are added at each end of the sample block 68 to ensure continuity of polarization compensation. These buffer samples define the minimum desirable amount of overlap between sample blocks 68 in adjacent data paths.

Returning to FIG. 7, each data path includes a respective polarization compensator 24, carrier recovery block 38 and NLC block 40, all of which can operate substantially as described above with reference to FIGS. 2-6.

Figure 9:
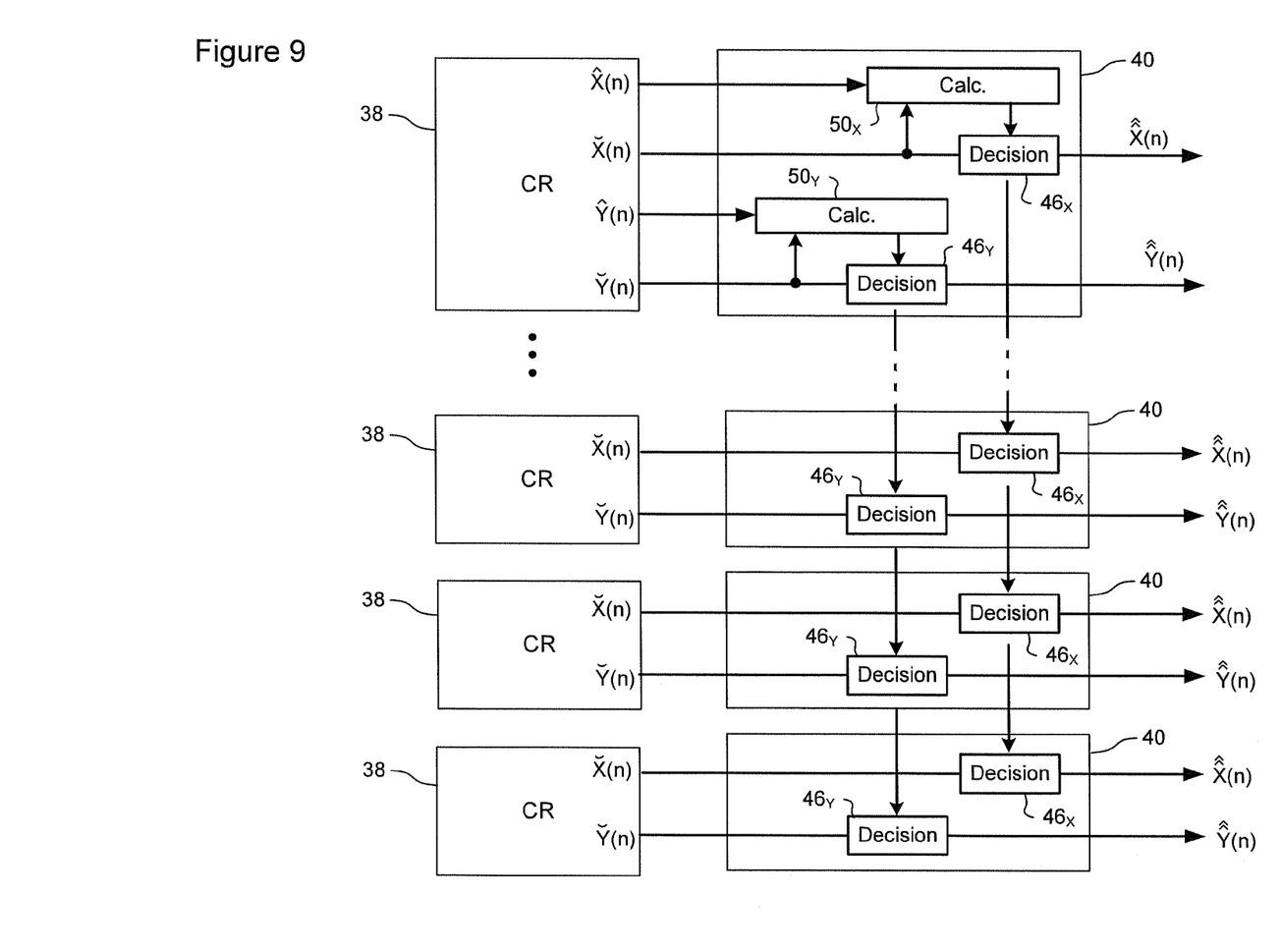
FIG. 9 is a block diagram illustrating an alternative non-linear compensator block usable in the embodiment of FIGS. 7 and 8a-b.

FIG. 9 illustrates an alternative embodiment of the NCL block 40, in which calculation of ISI-compensation values $\Im_n[\text{Addr}]$, distance metrics $M(m,j)$, and the most probable symbol value $\hat{X}(n)$ for each possible soft decision value $\tilde{X}(n)=A$ is performed on one path, and the results propagated to NLC decision blocks 46 of neighbouring data paths. This approach assumes that DC offset and residual ISI will affect all of the data paths in approximately the same manner.

Figure 10A:
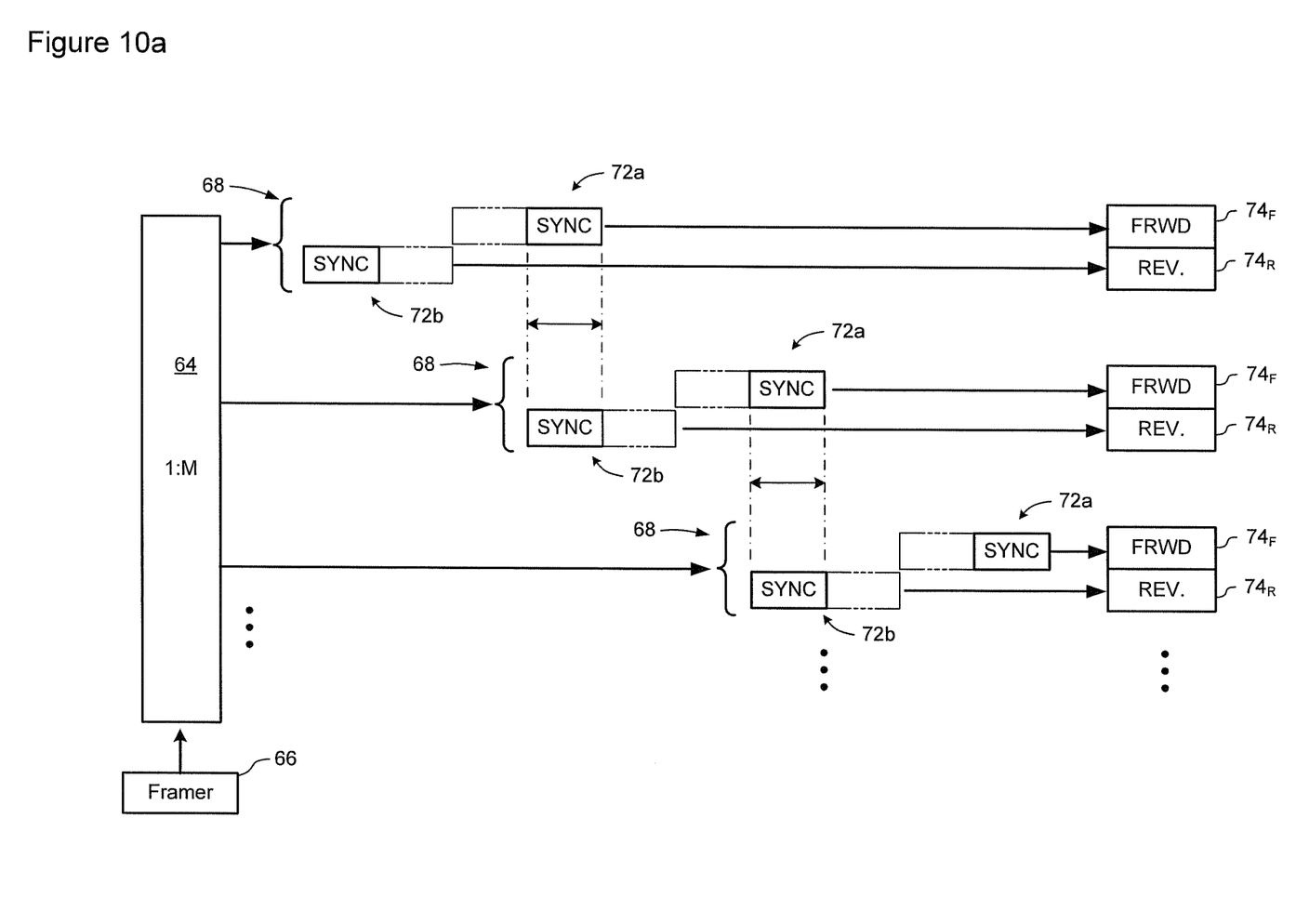
FIGS. 10a and 10b are block diagrams illustrating an alternative operation of the distribution block of FIG. 7.
Figure 10B:
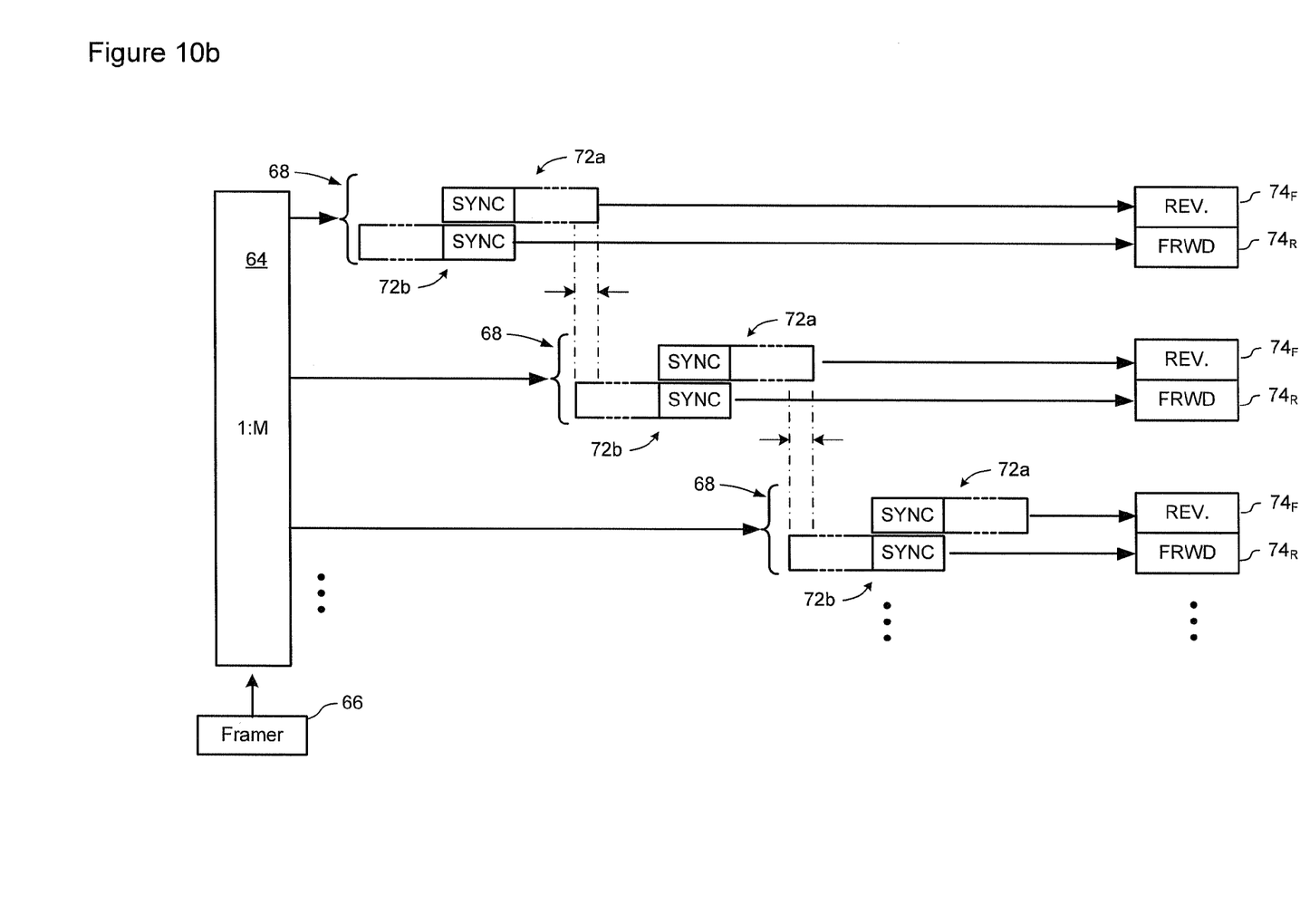
Figure 11:
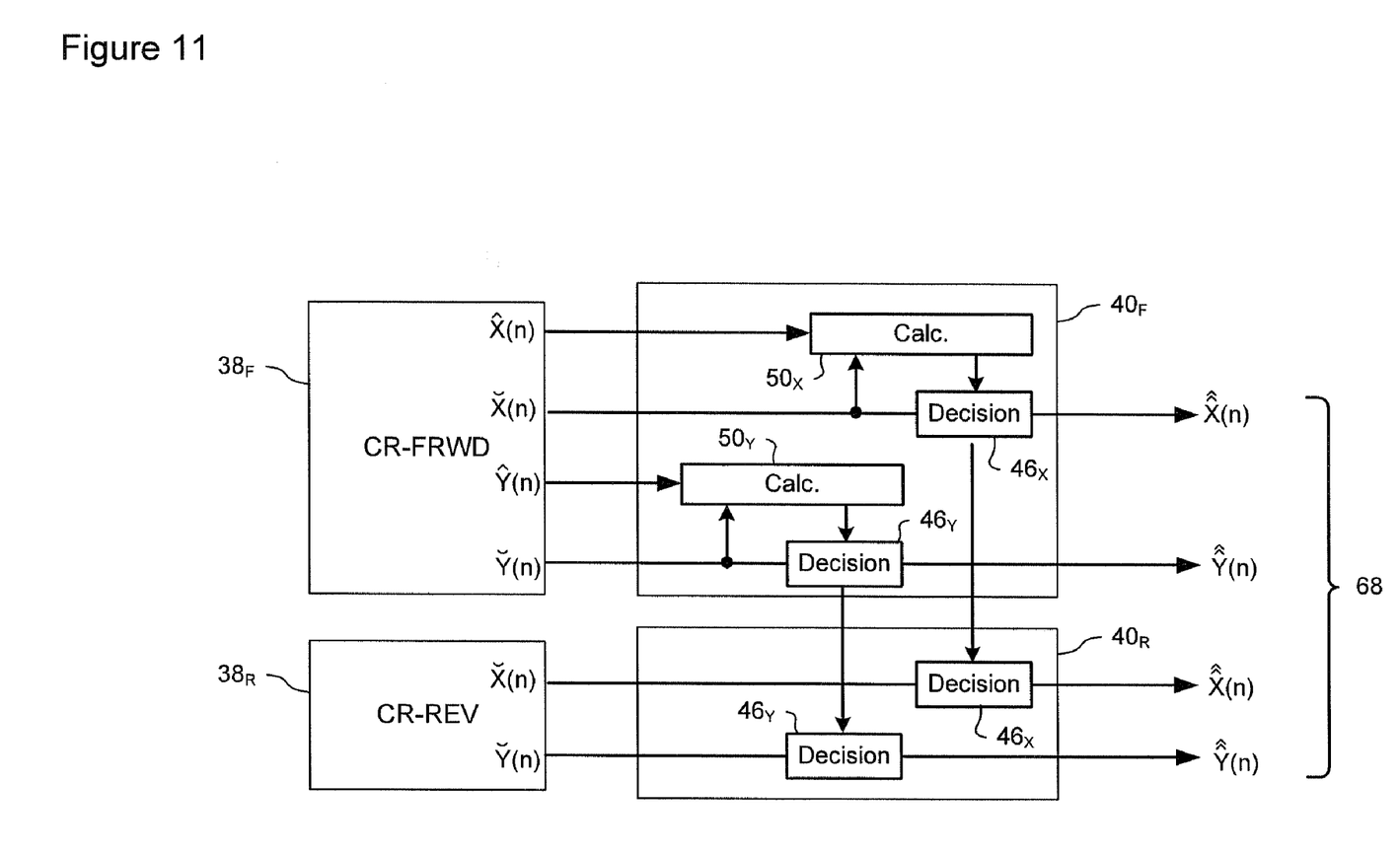
FIG. 11 is a block diagram illustrating an alternative non-linear compensator block usable in the embodiment of FIGS. 7 and 10a-b.

As may be appreciated, by suitably selecting the order in which data samples are read from the distribution block 64, it is possible to reverse the time-order of the sample stream, so that the above-described methods can be used to process data samples that lead the SYNC burst 70 in the optical signal. Thus, for example, the sample blocks 68 of FIGS. 8*a* and 8*b* may be divided into sub-blocks 72 as shown in FIGS. 10*a* and 10*b*. In this case, each data path is divided into respective "forward" and "reverse" processing sub-paths 74, each of which operates as described above with reference to FIGS. 2-7, except that the samples within the "reverse" processing paths 74$_R$ are time-reversed. As shown in FIG. 11, each NLC block 40 is divided into respective "forward" and "reverse" sub-blocks 40$_F$, 40$_R$. In this case, calculation of ISI-compensation values $\Im[\text{Addr}]$, distance metrics $M(m,j)$, and the most probable symbol value $\hat{X}(n)$ for each possible soft decision value $\tilde{X}(n)=A$ is performed in the forward sub-block 40$_F$, and the results propagated to the reverse sub-block 40$_R$.

As may be appreciated, the time-order of the symbol values output from the reverse-path NLC sublock 40$_R$ must be reversed prior to recombining the two symbol streams.

In the foregoing embodiments, the NLC block 40 utilizes a number of successive hard decision values $\hat{X}(n)$ to determine respective ISI-compensation values $\Im_n[\text{Addr}]$ for each possible soft decision value $\tilde{X}(n)=A$. This arrangement is advantageous in that it can be implemented with, a relatively small circuit, particularly in embodiments in which dispersion, polarization, clock, and Local Oscillator phase have already been subject to linear compensation which reduces the range of the residual degradations. However, this is not essential.

For example, alternative methods can use more symbols; can use soft decisions $\tilde{X}(n)$ instead of hard decisions $\hat{X}(n)$ to obtain the ISI compensation value; and/or can use more complex nonlinear equalization algorithms such as Viterbi, MLSE or MAP.

In a further alternative, any of the linear compensation stages, described above (i.e. the dispersion compensators 20, polarization compensators 24 and carrier recovery block 28) can be made nonlinear, if desired. Non-linear compensation steps of this type may be used alone, or in combination with applying nonlinear compensation to the soft decisions $\tilde{X}(n)$. For example, the polarization compensators 24 could be designed to implement a nonlinear polarization compensation method, so as to directly compensate nonlinear polarization degradations arising from Kerr effect. Similarly, the dispersion compensator 20 could be made nonlinear to directly compensate the nonlinear Self Phase Modulation effects. Where sufficient degradation range and adaptation speed can be obtained for the required application, complex nonlinear equalization methods such as Viterbi, MLSE or MAP can be used in these stages. The implementation complexity of nonlinear methods generally grows exponentially with degradation range. In many applications it is desirable to perform linear equalization first and then apply a nonlinear equalization with a reduced range. Iterations of multiple stages of linear and nonlinear equalization may be valuable for compensation of distributed degradations such as Self Phase Modulation.

The embodiments of the invention described above are intended to be illustrative only. The scope of the invention is therefore intended to be limited solely by the scope of the appended claims.

We claim:

1. A method of recovering a most likely value of each symbol transmitted through an optical communications network using a high speed optical signal, the method comprising, in a receiver of the network, steps of:

a data path of the receiver processing a stream of multi-bit digital samples of the optical signal using a first compensation function to generate a respective soft decision value $\tilde{X}(n)$ of each transmitted symbol; and a non-linear compensator applying a second compensation function to each soft decision value $\tilde{X}(n)$ to generate a most likely symbol value $\hat{X}(n)$;

wherein processing the stream of multi-bit digital samples of the optical signal comprises:

processing the multi-bit digital samples to generate multi-bit symbol estimates X'(n) of transmitted symbols; and rotating a respective phase of each symbol estimate X'(n) to compensate a frequency mismatch between a local oscillator and a carrier of the optical signal.

2. A method as claimed in claim 1, wherein the first compensation function comprises a linear equalization function for at least partially compensating any one or more of linear dispersion, linear polarization distortions and carrier phase error.

3. A method as claimed in claim 2, wherein the first compensation function further comprises a non-linear equalization function for compensating either one or both of non-linear dispersion and non-linear polarization effects.

4. A method as claimed in claim 2, wherein the step of processing the stream of multi-bit digital samples to generate multi-bit symbol estimates X'(n) of transmitted symbols comprises steps of:

processing the multi-bit digital samples to generate a dispersion compensated symbol stream; and deconvolving a transmitted polarization from the dispersion compensated symbol stream to generate a respective stream of multi-bit symbol estimates X'(n).

5. A method as claimed in claim 1, wherein the second compensation function comprises a non-linear equalization function for at least partially compensating a residual Inter-Symbol Interference (ISI) of the multi-bit symbol estimates.

6. A method as claimed in claim 4, wherein the step of applying a second compensation function to each soft decision value $\tilde{X}(n)$ comprises steps of:

processing each soft decision value $\tilde{X}(n)$ to generate a corresponding hard decision value $\hat{X}(n)$ having an ideal amplitude and phase;

processing a plurality of successive soft decision values and hard decision values to accumulate an ISI compensation value for each possible value A of the soft decision value $\tilde{X}(n)$;

determining a mapping between each possible value A of the soft decision value $\tilde{X}(n)$ and a respective most likely symbol value $\hat{X}(n)$; and applying the mapping to each soft decision value $\tilde{X}(n)$.

7. A method of recovering a most likely value of each symbol transmitted through an optical communications network using a high speed optical signal, the method comprising, in a receiver of the network, steps of:

a data path of the receiver processing a stream of multi-bit digital samples of the optical signal to generate a respective multi-bit estimate X'(n) of each transmitted symbol;

a carrier recovery block of the receiver applying a first function to each symbol estimate X'(n) to generate a corresponding soft decision value $\tilde{X}(n)$, wherein applying the first function comprises rotating a respective phase of each symbol estimate X'(n) to compensate a frequency mismatch between a local oscillator and a carrier of the optical signal;

the carrier recovery block further processing each soft decision value $\tilde{X}(n)$ to generate a corresponding hard decision value $\hat{X}(n)$ having an ideal amplitude and phase;

a parameter calculator processing a plurality of successive soft decision values and hard decision values to determine a second function; and a non-linear compensator applying the second function to each soft decision value $\tilde{X}(n)$ to generate a most likely symbol value $\hat{X}(n)$.

8. A method as claimed in claim 7, wherein the step of processing a stream of multi-bit digital samples of the optical signal comprises steps of:

processing the multi-bit digital samples to generate a dispersion compensated symbol stream; and deconvolving a transmitted polarization from the dispersion compensated symbol stream to generate a respective stream of multi-bit symbol estimates.

9. A method as claimed in claim 8, wherein the step of deconvolving a transmitted polarization from the dispersion compensated symbol stream comprises a step of compensating a polarization angle difference between the transmitted polarization and the received optical signal.

10. A method as claimed in claim 7, wherein each multi-bit symbol estimate comprises a respective multi-bit estimate of amplitude and a phase components of a corresponding transmitted symbol.

11. A method as claimed in claim 7, wherein the stream of multi-bit digital samples comprises a block of contiguous samples encompassing at least one SYNC burst and a plurality of data symbols, each SYNC burst having a predetermined symbol sequence.

12. A method as claimed in claim 7, wherein the step of processing each soft decision value $\tilde{X}(n)$ to generate a corresponding hard decision value $\hat{X}(n)$ comprises a step of mapping two most significant bits (MSBs) of the soft decision value $\tilde{X}(n)$ to a corresponding hard decision value $\hat{X}(n)$ having an ideal amplitude and phase for a quadrant in which the soft decision value $\tilde{X}(n)$ lies.

13. A method as claimed in claim 7, wherein the step of processing a plurality of successive soft decision values and hard decision values to determine a second function comprises steps of:

accumulating, for each combination of three consecutive hard decision values $\hat{X}(n)$, $\hat{X}(n-1)$ and $\hat{X}(n-2)$, an ISI compensation value $\Im_n[\text{Addr}]$ based on a corresponding soft decision value $\tilde{X}(n-1)$ where Addr is an index value determined by the consecutive hard decision values $\hat{X}(n)$, $\hat{X}(n-1)$ and $\hat{X}(n-2)$; and for each possible value A of the soft decision value $\tilde{X}(n)$:
using the accumulated ISI compensation values $\Im_n[\text{Addr}]$ to compute an array of distance metrics M(m, j), where m=0 ... 3, j=0 ... 15 for either one of QPSK and 4ASK encoded symbols, and m=0 ... 1, j=0 ... 3 for BPSK encoded symbols;

processing the array of distance metrics M(m,j) to obtain a parameter value P(m); and mapping the parameter value P(m) to a most likely symbol value $\hat{X}(n)$ corresponding to the soft decision value $\tilde{X}(n)=A$.

14. A method as claimed in claim 13, wherein the ISI compensation value $\Im_n[\text{Addr}]$ is calculated in accordance with $\Im_n[\text{Addr}]=\Im_{n-1}[\text{Addr}]+\mu_{NC}[\alpha*\tilde{X}(n-1)-\Im_{n-1}[\text{Addr}]]$, where $\alpha$ is a scaling factor used to adjust a number of bits resolution of $\tilde{X}(n-1)$ to equal that of $\Im_n[\text{Addr}]$; and $\mu NC$ is a training step size.

15. A method as claimed in claim 14, wherein $\mu_{NC}$ has a value of between $2^{-5}$ and $2^{-0}$.

16. A method as claimed in claim 13, wherein the distance metrics M(m,j) are calculated in accordance with one of:

$$M(m, j) = \frac{|\alpha * A - \Im[16m + j]|^2}{N_0}$$

for either one of QPSK and 4ASK encoded symbols, where m=0 ... 3, j=0 ... 15, and $N_0$ represents an expected noise floor; and $$M(m, j) = \frac{|\alpha * A - \Im[4m + j]|^2}{N_0}$$

for BPSK encoded symbols, where m=0 ... 1, j=0 ... 3; wherein $N_0$ represents an expected noise floor.

17. A method as claimed in claim 16, wherein the step of processing the array of distance metrics M(m,j) to obtain a parameter value P(m) comprises steps of:

initializing P(m)=M(m,0)*$\alpha$; and recursively calculating:

$$P(m) = -\min\{M(m, k), P(m)\} + \text{floor}\left[\alpha * \log\left(1 + e^{-\frac{|M(m,k)-P(m)|}{\alpha}}\right) + 0.5\right],$$

where k=1 ... 3 for BPSK encoded symbols and k=1 ... 15 for QPSK and 4ASK encoded symbols.

18. A method as claimed in claim 17, wherein the step of mapping the parameter value P(m) to a most likely symbol value $\hat{X}(n)$ comprises steps of:

selecting a value m=$m_0$ which corresponds to max[P(m)]; and mapping $m_0$ to the most likely symbol value $\hat{X}(n)$.

19. A method as claimed in claim 13, wherein the transmitted symbols are either one of QPSK and 4ASK encoded symbols, and wherein the distance metrics M(m,j) are calculated in accordance with either one of:

M(m,j)=$|\alpha*A-\Im[16m+j]|^2$ for either one of QPSK and 4ASK encoded symbols, where m=0 ... 3, j=0 ... 15, and $N_0$ represents an expected noise floor; and M(m,j)=$|\alpha*A-\Im[4m+j]|^2$ for BPSK encoded symbols; where m=0 ... 1, j=0 ... 3.

20. A method as claimed in claim 19, wherein the step of processing the array of distance metrics M(m,j) to obtain a parameter value P(m) comprises steps of:
  initializing P(m)=M(m,0)*α; and
  recursively calculating:

$$P(m) = \sum_j |\alpha * A - \Im[16m + j]|^2,$$

where k=1 . . . 3 for BPSK encoded symbols and k=1 . . . 15 for QPSK and 4ASK encoded symbols.

21. A method as claimed in claim 20, wherein the step of mapping the parameter value P(m) to a most likely symbol value $\hat{X}(n)$ comprises steps of:
  selecting a value $m=m_0$ which corresponds to min[P(m)]; and
  mapping $m_0$ to the most likely symbol value $\hat{X}(n)$.

22. A method as claimed in claim 13, wherein the step of applying the second function to each soft decision value $\tilde{X}(n)$ comprises a step of storing the respective most likely symbol value $\hat{X}(n)$ corresponding to each possible soft decision value $\tilde{X}(n)$=A in a look-up table.

* * * * *